United States Patent
Knee

(10) Patent No.: US 8,526,716 B2
(45) Date of Patent: Sep. 3, 2013

(54) ANALYSIS OF STEREOSCOPIC IMAGES

(75) Inventor: Michael James Knee, Petersfield (GB)

(73) Assignee: Snell Limited, Reading, Berkshire (GB)

( * ) Notice: Subject to any disclaimer, the term of this patent is extended or adjusted under 35 U.S.C. 154(b) by 63 days.

(21) Appl. No.: 13/415,962

(22) Filed: Mar. 9, 2012

(65) Prior Publication Data

US 2012/0230580 A1    Sep. 13, 2012

(30) Foreign Application Priority Data

Mar. 11, 2011  (GB) .................................. 1104159.7

(51) Int. Cl.
    *G06K 9/00* (2006.01)
(52) U.S. Cl.
    USPC ........................................................ 382/154
(58) Field of Classification Search
    USPC . 382/154, 209, 220, 284, 309; 345/419–420;
                                            348/42, 47, 48, 51
    See application file for complete search history.

(56) References Cited

U.S. PATENT DOCUMENTS

| 5,856,843 | A | 1/1999 | Muramoto | |
|---|---|---|---|---|
| 6,268,881 | B1 | 7/2001 | Muramoto | |
| 8,228,327 | B2 * | 7/2012 | Hendrickson et al. | 345/420 |
| 2009/0219283 | A1 * | 9/2009 | Hendrickson et al. | 345/420 |
| 2010/0060720 | A1 | 3/2010 | Hirasawa | |
| 2011/0050857 | A1 | 3/2011 | Lee et al. | |
| 2011/0169818 | A1 * | 7/2011 | Pan et al. | 345/419 |
| 2012/0113093 | A1 * | 5/2012 | Liao et al. | 345/419 |

OTHER PUBLICATIONS

Search Report from the United Kingdom Intellectual Property Office for Application No. 1104159.7 dated Jun. 28, 2011 (3 pages).

* cited by examiner

*Primary Examiner* — Daniel Mariam

(74) *Attorney, Agent, or Firm* — Michael Best & Friedrich LLP

(57) ABSTRACT

A method of processing in an image processor a pair of images intended for stereoscopic presentation to identify left-eye and right-eye images of the pair. The method includes dividing both images of the pair into a plurality of like image regions, determining for each region a disparity value between the images of the pair to produce a set of disparity values, deriving for each region a confidence factor for the disparity value, determining a correlation parameter between the set of disparity values and a corresponding set of disparity values from a disparity model, in which the contribution of the disparity value for a region to the said correlation parameter is weighted in dependence on the confidence factor for that region, and identifying from said correlation parameter the left-eye and right-eye images of the pair, wherein the left eye and right images form a stereoscopic pair.

20 Claims, 2 Drawing Sheets

ANALYSIS OF STEREOSCOPIC IMAGES

FIELD OF INVENTION

This invention concerns the analysis of stereoscopic images and in one example to the detection and correction of errors in stereoscopic images. It may be applied to stereoscopic motion-images.

BACKGROUND OF THE INVENTION

The presentation of 'three-dimensional' images by arranging for the viewer's left and right eyes to see different images of the same scene is well known. Such images are typically created by a 'stereoscopic' camera that comprises two cameras that view the scene from respective viewpoints that are horizontally spaced apart by a distance similar to that between the left and right eyes of a viewer.

This technique has been used for 'still' and 'moving' images. There is now great interest in using the electronic image acquisition, processing, storage and distribution techniques of high-definition television for stereoscopic motion-images.

Many ways of distributing stereoscopic image sequences have been proposed, one example is the use of separate image data streams or physical transport media for the left-eye and right-eye images. Another example is the 'side-by-side' representation of left-eye and right-eye images in a frame or raster originally intended for a single image. Other methods include dividing the pixels of an image into two, interleaved groups and allocating one group to the left-eye image and the other group to the right-eye image, for example alternate lines of pixels can be used for the two images.

To present the viewer with the correct illusion of depth, it is essential that his or her left eye sees the image from the left side viewpoint, and vice-versa. If the left-eye and right-eye images are transposed so that the left eye sees the view of the scene from the right and the right eye sees the view from the left, there is no realistic depth illusion and the viewer will feel discomfort. This is in marked contrast to the analogous case of stereophonic audio reproduction where transposition of the left and right audio channels produces a valid, equally-pleasing (but different) auditory experience.

The multiplicity of transmission formats for stereoscopic images leads to a significant probability of inadvertent transposition of the left and right images. The wholly unacceptable viewing experience that results from transposition gives rise to a need for a method of detecting, for a given 'stereo-pair' of images, which is the left-eye image, and which is the right-eye image. In this specification the term 'stereo polarity' will be used to denote the allocation of a stereo pair of images to the two image paths of a stereoscopic image processing or display system. If the stereo polarity is correct then the viewer's left and right eyes will be presented with the correct images for a valid illusion of depth.

In a stereo-pair of images depth is represented by the difference in horizontal position—the horizontal disparity—between the representations of a particular object in the two images of the pair. Objects intended to appear in the plane of the display device have no disparity; objects behind the display plane are moved to the left in the left image, and moved to the right in the right image; and, objects in front of the display plane are moved to the right in the left image, and moved to the left in the right image.

If it were known that all (or a majority of) portrayed objects were intended to be portrayed behind the display plane, then measurement of disparity would enable the left-eye and right-eye images to be identified: in the left-eye image objects would be further to the left than in the right-eye image; and, in the right-eye image objects would be further to the right than in the left-eye image.

However, it is common for objects to be portrayed either in front of or behind the display plane; and, a constant value may be added to, or subtracted from the disparity for a pair of images as part of the process of creating a stereoscopic motion-image sequence. For these reasons a simple measurement of horizontal disparity cannot be relied upon to identify left-eye and right-eye images of a stereo pair.

Some attempts have been made to overcome this problem by making statistical assumptions about image portrayal, specifically that an object appearing lower in an image is assumed to be to the front of an object appearing higher in the image. Reference is directed in this context to U.S. Pat. No. 6,268,881 and US 2010/0060720.

SUMMARY OF THE INVENTION

In one aspect, the present invention consists in a method of processing in an image processor a pair of images intended for stereoscopic presentation to identify the left-eye and right-eye images of the pair, comprising the steps of dividing both image into a plurality of like image regions; determining for each region a disparity value between the images of the pair to produce a set of disparity values for the image pair; deriving for each region a confidence factor for the disparity value; determining a correlation parameter between the set of disparity values for the pair of images and a corresponding set of disparity values from a disparity model, in which the contribution of the disparity value for a region to the said correlation parameter is weighted in dependence on a confidence factor for that region; and identifying from said correlation parameter the left-eye and right-eye images of the pair.

In another aspect, the present invention consist in a method of processing images intended for stereoscopic presentation, comprising the steps of determining the spatial variation of disparity between images of a stereoscopic pair, comparing the determined spatial variation of disparity with a disparity model and identifying therefrom the left-eye and right-eye images of the pair; in which the disparity model represents objects at the sides of the frame as closer to the camera than objects nearer the horizontal centre of the frame.

BRIEF DESCRIPTION OF THE DRAWINGS

An example of the invention will now be described with reference to the drawings in which.

DETAILED DESCRIPTION OF AN EMBODIMENT

A method of identifying the stereo polarity of a pair of images intended for stereoscopic presentation will now be described. The method is based on evaluating the correlation between: the measured spatial distribution of horizontal disparity between the pair of images; and an expected model of that spatial distribution.

Figure 1:
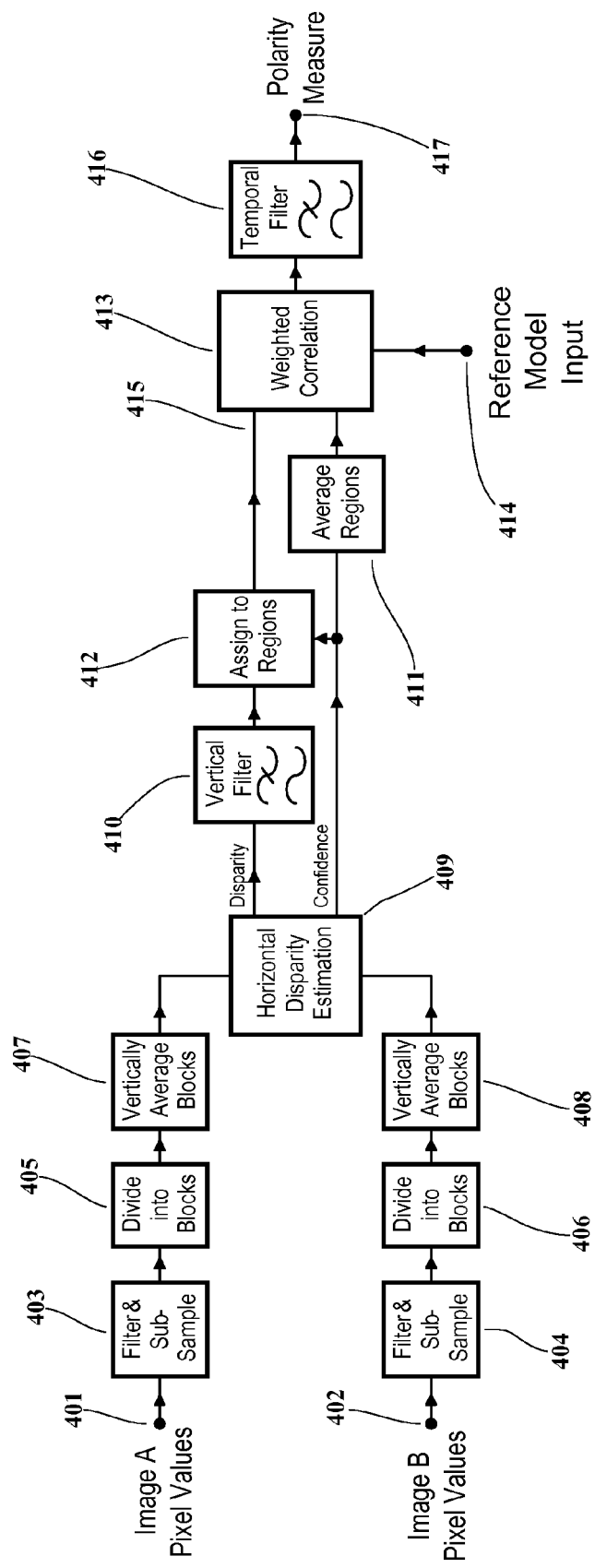
FIG. 1 shows a block diagram of an embodiment of the invention.

A block diagram of one possible implementation of this method is shown in FIG. 1. Pixel values for the respective images of a stereo pair of images are input at terminal (401)

for image A and terminal (402) for image B. Typically these values will be luminance values of pixels. The two sets of pixel values are optionally filtered and down-sampled at (403) for image A and (404) for image B. In this example horizontal down-sampling by a factor of two is used, and input images having 720 pixels per line are down-sampled in the well-known manner so that they are represented by 360 pixels per line. In the description that follows, references to pixels correspond to these sub-sampled pixels.

Figure 2:
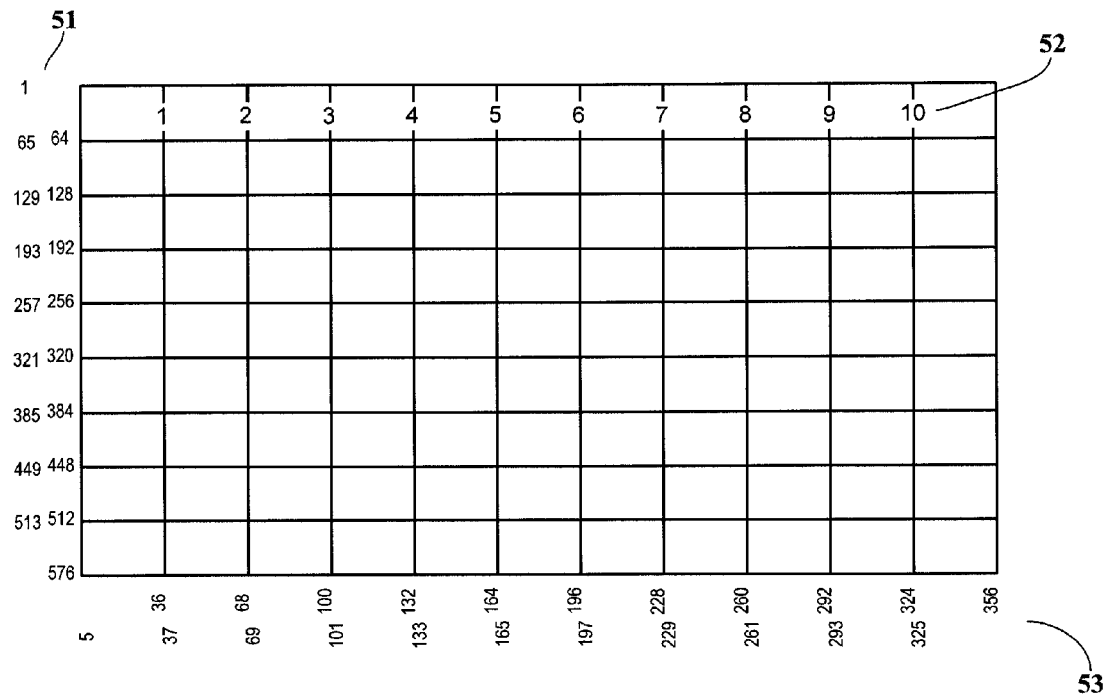
FIG. 2 shows the allocation of pixels of a horizontally subsampled image to horizontally overlapping blocks.

The two images are then each identically divided, at (405) and (406), into horizontally overlapping blocks of pixels. A suitable block structure is shown in FIG. 2; it comprises a rectangular array, nine blocks high by 10 blocks wide. In this example, the input image has 576 lines and so each block is 64 lines high. The line numbers at the top and bottom of each block are shown in the Figure at (51); the top row of blocks includes parts of lines 1 to 64 and the bottom row includes parts of lines 513 to 576.

The blocks are 64 pixels wide, and overlap each other by 50%, and so the total width of the ten blocks is 352 pixels. The vertical grid of FIG. 2 corresponds to the block edges; the horizontal centre of each block corresponds with opposite edges of its neighbours. The positions of the horizontal centres of each column of blocks are shown by the numerals (52). A horizontal count of pixels is shown at (53); the first column of blocks includes pixels 5 to 68 of the relevant lines, and the last column includes pixels 293 to 356. Thus the total width of all ten columns is eight pixels less than the 360 pixels of each down-sampled line; four pixels at the start of each line, and four pixels at the end of each line, are therefore discarded.

Returning to FIG. 1, each block is vertically averaged to obtain a 'one-dimensional block' of 64 average pixel values, where each average value is the average of one of the 64 vertical columns of 64 pixels that comprise the block. The blocks representing image A are averaged at (407), and the blocks of image B are averaged at (408). The vertical averaging may expressed as follows:

Let the set of 4,096 pixel values for a block be $Y_{2D}(i,j)$

Where: (i,j) are the Cartesian coordinates of the pixels of the block, with (1,1) at the top left corner of the block, and (64,64) at the bottom right corner of the block.

Then, the set of 64 pixel values for the corresponding one-dimensional block $Y_{1D}(i)$ are given by:

$$Y_{1D}(i) = \Sigma Y_{2D}(i,j) \div 64 \quad [1]$$

Where the range of the summation is all 64 values of j.

Respective pairs of co-located one-dimensional blocks from input image A and input image B are compared in a horizontal disparity estimation process (409). The result is a measure of the horizontal displacement of the picture content of image A with respect to the content of image B at each block position. The horizontal disparity estimation process (409) can use any of the known methods of image motion estimation, for example phase-correlation or block matching. Because the process is one-dimensional, the required processing resource is modest. The disparity estimation process finds the shifted positions of one-dimensional blocks from image A that best match the corresponding one-dimensional blocks from image B. The disparity output for a block is the signed magnitude of the horizontal shift in units of the (horizontally sub-sampled) pixel pitch. The sign is positive when image A has to be shifted to the right in order to obtain a match; and, the sign is negative when image A has to be shifted to the left in order to obtain a match.

Preferably, the horizontal disparity estimation process (409) also outputs a confidence measure for each measured block disparity value. In the case of phase correlation, where the measured disparity corresponds to the position of a peak in a correlation function, the confidence measure can be a measure of the height of that peak. Where block matching is used, the confidence measure can be derived from the match error, for example the reciprocal, or negative exponential, of a sum of pixel value differences between respective displaced pixel values (displaced by the disparity value) of the one-dimensional blocks.

It is also possible to use data describing image feature points, for example the method of describing image features described in GB-A-2474281, to determine the disparity. The disparity value for a block is then the average horizontal position difference between equivalent feature points in corresponding blocks from image A and image B. In this case it will usually be preferable to use the block data prior to vertical averaging in order to identify feature points for measurement. A confidence measure for disparity measured in this way can be derived from the number of matching feature points found in the relevant block, so that where many matching feature points are found, the confidence is high.

An alternative confidence value for a block, which may be simpler to evaluate in some embodiments, is the standard deviation of pixel values evaluated for the combination of the pixels in image A and image B for the relevant block.

The disparity values from the disparity estimation process (409) are vertically filtered in a low-pass filter (410). A suitable filter is given by:

$$F(D_{I,J}) = [D_{I,(J-1)} + 2D_{I,J} + D_{I,(J+1)}] \div 4 \quad [2]$$

Where: $F(D_{I,J})$ is the filtered disparity; and, $D_{I,J}$ is the disparity value for the block having Cartesian coordinates (I,J) such that block (1,1) is the top left block and block (10,9) is the bottom right block of the image.

Note that it is usually helpful to 'edge pad' the disparity values in the well-known manner prior to applying the above equation, so that the top and bottom rows of values are respectively duplicated outside the image area in order to minimise the influence of the top and bottom edges of the frame.

In some cases the vertical low pass filtering can be applied as part of the disparity estimation process, for example by filtering the correlation functions or match errors prior to the determination of the disparity values for blocks.

The vertically filtered disparity values for blocks are then assigned to image regions at (412). Preferably this allocation process is weighted according to confidence so that disparity values with high confidence contribute more, and disparity values with low confidence contribute less, to the disparity values for their respective regions. The output (415) of the assignment process (412) is a disparity value for each region. The confidence values for blocks are also averaged over each image region at (411) to obtain an average confidence value for each region.

Figure 3:
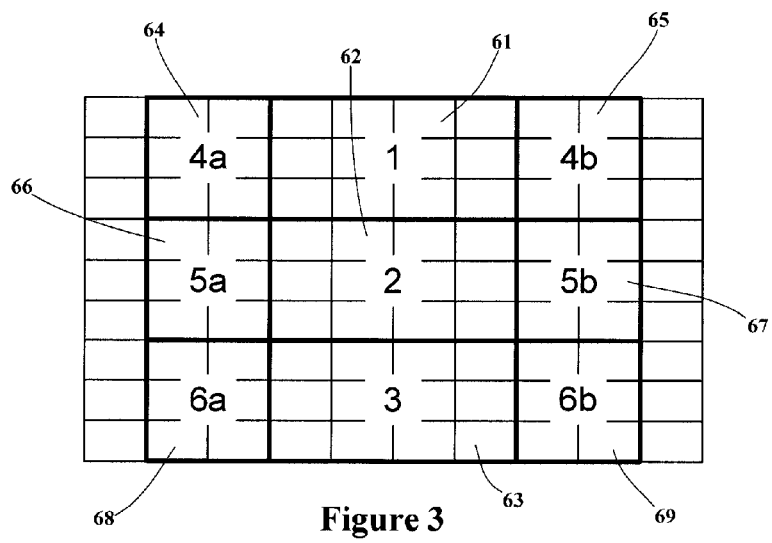
FIG. 3 shows the allocation of blocks to regions.

A suitable arrangement of regions is shown in FIG. 3, which illustrates how each region is made up of a set of blocks. For simplicity, this figure does not show the overlap of the blocks, it merely shows their relative positions. There are three central regions, each comprising a contiguous block of three rows and four columns of blocks: region 1 (61) corresponds to the top central region; region 2 (62) corresponds to the middle central region; and region 3 (63) corresponds to the bottom central region.

There are also three image-edge regions, each comprising two separate sets of six blocks. (In FIG. 3, the two parts of each region have 'a' or 'b' added to the respective region number.) Region 4 comprises the combination of a top left region (64) and a top right region (65). Region 5 comprises the combination of a left central region (66) and a right central region (67). Region 6 comprises the combination of a bottom left region (68) and a bottom right region (69). As can be seen from FIG. 3, the image edge regions do not include the blocks adjacent to the left and right edges of the frame. This is to reduce the effect of ambiguous disparity values from these blocks.

Because of the horizontal overlap of the blocks, some pixels will contribute to more than one region. For example, pixels towards the top of the frame at horizontal positions 101 to 132 (as shown at (53) in FIG. 2) will contribute to both region 4a and region 1.

The assessment of stereo polarity is made by calculating the correlation between: the set of disparity values for the regions; and, a reference model that comprises a typical set of disparity values for a pair of images where image A is the left-eye image and image B is the right-eye image. Preferably this correlation is a weighted correlation where contributions from regions of high confidence contribute more to the result than contributions from regions of low confidence. In the system of FIG. 1, a weighted correlation is made at (413) between a reference model input (414) and the regional confidence values (415).

A suitable correlation process is as follows:

$$C = [\Sigma\{w_k(\delta_k - \delta_{Mean})R_k\}] \div N \qquad [3]$$

Where: C is the computed correlation factor;
The summation is made over all regions;
$w_k$ is the confidence value for region k;
$\delta_k$ is the disparity for region k;
$\delta_{Mean}$ is the mean disparity for all regions (see equation 4 below);
$R_k$ is the disparity for region k of the reference model; and,
N is a normalisation factor (see equation 5 below).
A suitable expression for the mean disparity is:

$$\delta_{Mean} = [\Sigma\delta_k] \div 6 \qquad [4]$$

Where the summation is made over the six regions.
A suitable expression for the normalisation factor is:

$$N = \Sigma w_k \times \sqrt{\Sigma(\delta_k - \delta_{Mean})^2} \times \Sigma\sqrt{R_k^2} \qquad [5]$$

Where the summations are all made over the six regions.
Note that typically, the reference model itself is normalised so that $\Sigma R_k$ is unity.
Note also that the regional confidence weighting is optional, so that all the values $w_k$ may be set to unity if this weighting is not used.

The correlation factor C is a number in the range ±1. The larger the positive result the greater the similarity of the spatial distribution of measured disparity values with the distribution of the reference model. Large positive results are therefore evidence that image A is the left-eye image, and image B is the right-eye image. Large negative results indicate similarity with an inverted version of the reference model, where the directions of the disparity values are reversed. Large negative results are therefore evidence of the opposite stereo polarity.

When processing sequences of related images, for example a motion image sequence, the correlation result C from the weighted correlation (413) can be improved by 'temporal' filtering, where results from related image pairs are combined. This is shown in FIG. 1 by the temporal low-pass filter (416), which could, for example, be a running average of correlation values. The output from the temporal filter (416) is a stereo polarity measure (417). An output exceeding a positive threshold gives confirmation that the stereo polarity is the same as that used to determine the reference model (414); an output below a negative threshold indicates the opposite polarity; and, a value close to zero indicates that the polarity cannot be reliably determined. A suitable threshold value is of the order of 0.05.

A suitable reference model input for the regional structure shown in FIG. 3 is:
Region 1: +10
Region 2: 0
Region 3: −20
Region 4: 0
Region 5: −5
Region 6: −25

The rationale for choosing this model is that, for typical images, the lower part of the frame is more likely to be close to the camera (e.g. the ground), and the upper part of the frame is more likely to be distant (e.g. the sky). And, objects at the sides of the frame are often closer to the camera than objects nearer the horizontal centre of the frame.

Objects at infinity have a disparity equal to the inter-ocular (or inter-camera) distance, such that the left-eye image is displaced to the left relative to the right-eye image; and, the right-eye image is displaced to the right with respect to the left-eye image. Objects in the plane of the display screen have no disparity. Objects in front of the display screen have disparity opposite to distant objects so that the left-eye image is displaced to the right with respect to the right-eye image, and the right-eye image is displaced to the left with respect to the left-eye image. Thus if the inter-image disparity is expressed as the leftward shift of the left-eye image with respect to the right-eye image, then positive disparity is indicative of distant objects, and negative disparity is indicative of very near objects.

The reference model may also be obtained from analysis of typical stereo images; or the model may be optimised in an iterative process that compares the result of using the model on material having known stereo polarity with that known polarity.

Provided that three or more regions are used, the average of the disparity values of the model, and the range of the values of the model have no effect on the correlation result. Thus these aspects of the model can be chosen to simplify implementation. This also has the advantage that the method is unaffected by the range of disparity values present, which may differ for different types of image content, and the maximum disparity value, which may vary for different intended display sizes.

This alternative method can be implemented in different ways. Block structures different from that described above can be used, and the blocks can overlap horizontally, vertically or not at all. The disparity measurements for blocks may use horizontal or two-dimensional measures of inter-block match position. Where a two dimensional measure is used, the horizontal component of the measured match position is used as the disparity value.

Regional structures differing from that shown in FIG. 3 can be used. Fewer regions simplify implementation of the process but are more likely to give inconclusive, or incorrect results. Regions may be contiguous, or may comprise separate parts of the image for which disparity data is combined.

Images may be spatially subsampled or oversampled in either one or two dimensions prior to disparity measurement, and the disparity measures may be spatially filtered in one or two dimensions prior to comparison with the model of disparity distribution.

Data from related images may be combined prior to analysis, for example by temporal filtering of a motion image sequence.

The model of disparity distribution may have any spatial resolution or any numerical resolution of the disparity values.

The invention claimed is:

1. A method of processing in an image processor a pair of images intended for stereoscopic presentation to identify left-eye and right-eye images of the pair, the method comprising: dividing both images of the pair into a plurality of like image regions; determining for each region a disparity value between the images of the pair to produce a set of disparity values; deriving for each region a confidence factor for the disparity value; determining a correlation parameter between the set of disparity values and a corresponding set of disparity values from a disparity model, in which the contribution of the disparity value for a region to the said correlation parameter is weighted in dependence on the confidence factor for that region; and identifying from said correlation parameter the left-eye and right-eye images of the pair, wherein the left eye and right eye images form a stereoscopic pair.

2. A method according to claim 1 in which a horizontal disparity is evaluated for a plurality of respective pairs of co-located image blocks in the stereoscopic pair.

3. A method according to claim 2 in which image blocks overlap.

4. A method according to claim 1 in which image blocks are vertically averaged prior to determining the disparity value between the images of the pair.

5. A method according to claim 1 in which determining the disparity value between the images of the pair comprises phase correlation.

6. A method according to claim 1 in which determining the disparity value between the images of the pair comprises block matching.

7. A method according to claim 1 in which determining the disparity value between the images of the pair comprises identifying corresponding feature points in the pair of images and comparing their horizontal positions.

8. A method according to claim 1 in which a confidence value for an image block is determined from a standard deviation of values of pixels of that image block.

9. A method according to claim 1 in which a confidence value for an image block is determined from a height of a peak in a correlation function.

10. A method according to claim 1 in which a confidence value for an image block is determined from a match error comprising a sum of value differences between pixels in one image of the pair and respective shifted pixels in the other image of the pair.

11. A method according to claim 1 in which a confidence value for an image block is determined from the number of feature points in one image of the pair that match corresponding feature points in the other image of the pair.

12. A method of processing in an image processor images intended for stereoscopic presentation, the method comprising determining a spatial variation of disparity between images of a stereoscopic pair, comparing the determined spatial variation of disparity with a disparity model and identifying therefrom left-eye and right-eye images of the pair; in which the disparity model represents objects at sides of a frame as closer to the camera than objects nearer the horizontal center of the frame.

13. A non-transitory computer program product adapted to implement a method of processing in an image processor a pair of images intended for stereoscopic presentation to identify left-eye and right-eye images of the pair, the method comprising dividing both images of the pair into a plurality of like image regions; determining for each region a disparity value between the images of the pair to produce a set of disparity values for the image pair; deriving for each region a confidence factor for the measure of disparity; determining a correlation parameter between the set of disparity values and a corresponding set of disparity values from a disparity model, in which the contribution of the disparity value for a region to the said correlation parameter is weighted in dependence on the confidence factor for that region; and identifying from said correlation parameter the left-eye and right-eye images of the pair, wherein the left eye and right eye images form a stereoscopic pair.

14. A method according to claim 13 in which image blocks overlap.

15. A method according to claim 13 in which the image blocks are vertically averaged prior determining the disparity value between the images of the pair.

16. A method according to claim 13 in which determining the disparity value between images of the pair comprises phase correlation and in which a confidence value for an image block is determined from a height of a peak in a correlation function.

17. A method according to claim 13 in which determining the disparity value between images of the pair comprises block matching and in which the confidence value for an image block is determined from a match error comprising a sum of value differences between pixels in one image of the pair and respective shifted pixels in the other image of the pair.

18. A method according to claim 17 in which a confidence value for an image block is determined from the number of feature points in one image of the pair that match corresponding feature points in the other image of the pair.

19. A method according to claim 13 in which determining the disparity value comprises identifying corresponding feature points in the pair of images and comparing their horizontal positions.

20. A method according to claim 13 in which a confidence value for an image block is determined from a standard deviation of the values of the pixels of that block.

* * * * *